US009920240B2

(12) United States Patent
Vo et al.

(10) Patent No.: US 9,920,240 B2
(45) Date of Patent: Mar. 20, 2018

(54) TREATMENT FLUIDS CONTAINING POLYSACCHARIDES WITH FRICTION REDUCING GRAFTS THEREON

(71) Applicant: Halliburton Energy Services, Inc., Houston, TX (US)

(72) Inventors: Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/906,912

(22) PCT Filed: Oct. 14, 2013

(86) PCT No.: PCT/US2013/064802
§ 371 (c)(1),
(2) Date: Jan. 22, 2016

(87) PCT Pub. No.: WO2015/057183
PCT Pub. Date: Apr. 23, 2015

(65) Prior Publication Data
US 2016/0160117 A1    Jun. 9, 2016

(51) Int. Cl.
*E21B 43/26* (2006.01)
*C09K 8/68* (2006.01)
(Continued)

(52) U.S. Cl.
CPC .............. *C09K 8/68* (2013.01); *C09K 8/035* (2013.01); *C09K 8/88* (2013.01); *C09K 8/882* (2013.01);
(Continued)

(58) Field of Classification Search
CPC . C09K 8/68; C09K 8/085; C09K 8/88; C09K 8/882; C09K 2208/28; E21B 43/26
(Continued)

(56) References Cited

U.S. PATENT DOCUMENTS 4,703,801 A * 11/1987 Fry .................. C04B 24/18
106/719
5,532,297 A    7/1996 Woo et al.
(Continued)

FOREIGN PATENT DOCUMENTS

WO    2015057183 A1    4/2015

OTHER PUBLICATIONS

International Search Report and Written Opinion for PCT/US2013/064802 dated Jul. 24, 2014.

*Primary Examiner* — Silvana C Runyan
(74) *Attorney, Agent, or Firm* — McDermott Will & Emery LLP

(57) ABSTRACT

Method of treating a portion of a subterranean formation comprising: providing an aqueous-based treatment fluid comprising a friction-reducing grafted polymer wherein the friction-reducing grafted polymer comprises a friction-reducing polymer grafted to the polymer backbone; and, placing the aqueous-based treatment fluid into a portion of a subterranean formation. The treatment fluid may be (a) a fracturing fluid that is placed within the subterranean formation at a pressure sufficient to create or extend at least one fracture within the portion of the subterranean formation; (b) a gravel packing fluid, further including particulates, placed into a wellbore annulus within the subterranean formation to form a particulate pack therein; or (c) a frac-packing fluid, further including particulates, placed within the formation to pack a fracture within the formation with particulates and to fill a wellbore annulus within the subterranean formation adjacent to the fracture with a gravel pack.

17 Claims, 1 Drawing Sheet

(51) Int. Cl.
  *C09K 8/035* (2006.01)
  *C09K 8/90* (2006.01)
  *C09K 8/88* (2006.01)

(52) U.S. Cl.
  CPC ............... *C09K 8/90* (2013.01); *E21B 43/26* (2013.01); *C09K 2208/28* (2013.01)

(58) Field of Classification Search
  USPC .............................. 166/308.2, 305.1, 308.1
  See application file for complete search history.

(56) References Cited

U.S. PATENT DOCUMENTS

| | | | |
|---|---|---|---|
| 6,060,170 A | 5/2000 | Burgoyne, Jr. | |
| 6,096,234 A | 8/2000 | Nakanishi et al. | |
| 6,186,231 B1* | 2/2001 | Kalfoglou | C09K 8/512 |
| | | | 166/270 |
| 6,784,253 B2 | 8/2004 | Vilasagar et al. | |
| 2006/0032633 A1* | 2/2006 | Nguyen | C09K 8/68 |
| | | | 166/280.2 |
| 2007/0089881 A1 | 4/2007 | Hutchins et al. | |
| 2007/0281869 A1* | 12/2007 | Drochon | C09K 8/602 |
| | | | 507/219 |
| 2009/0075845 A1 | 3/2009 | Abad et al. | |
| 2010/0200239 A1 | 8/2010 | Aften | |
| 2012/0031618 A1* | 2/2012 | Armstrong | C09K 8/52 |
| | | | 166/305.1 |
| 2016/0061017 A1* | 3/2016 | Nguyen | E21B 43/267 |
| | | | 166/280.2 |

* cited by examiner

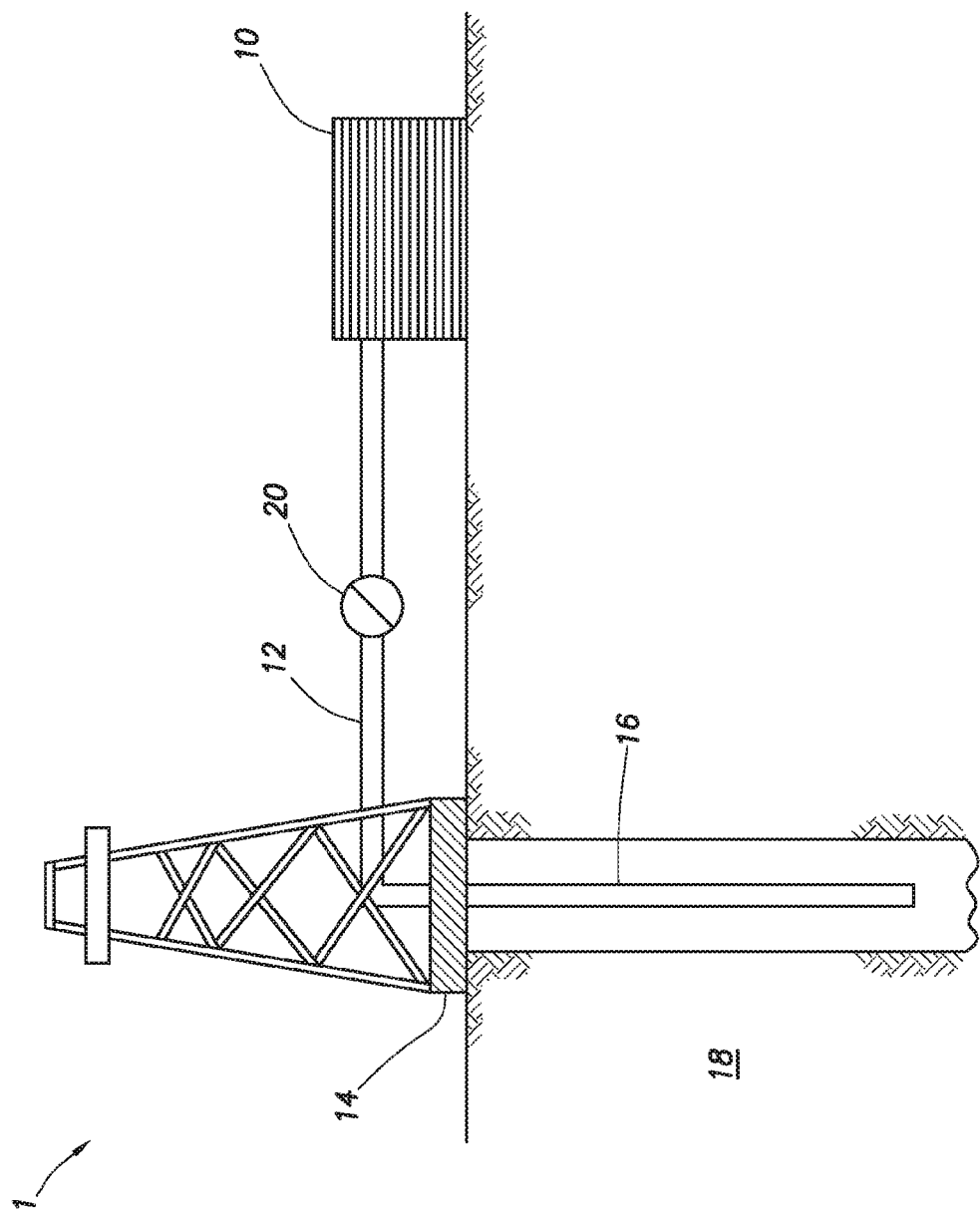

TREATMENT FLUIDS CONTAINING POLYSACCHARIDES WITH FRICTION REDUCING GRAFTS THEREON

BACKGROUND

The embodiments of the present disclosure generally relate to aqueous-based treatment fluids that can be crosslinked while simultaneously acting as friction reducers.

Aqueous treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. Illustrative treatment operations can include, for example, drilling operations, fracturing operations, gravel packing operations, acidizing operations, scale dissolution and removal operations, sand control operations, consolidation operations, and the like.

Moreover, many treatments require fluids that have increased viscosity. For instance, viscous fluids that are free of particulates are often pumped into a portion of a subterranean formation to initiate fractures in downhole stimulation operations. Once the fractures are initiated, a viscous fluid loaded with particulates (commonly known as proppant) is inserted into the created fractures. The particulates act to hold the fracture faces apart (that is, they "prop open" the fracture) once the fracturing pressure is released.

Hydrocarbon-producing wells also may undergo gravel packing treatments, inter alia, to reduce the migration of unconsolidated formation particulates into the well bore. In gravel-packing treatments, a viscosified treatment fluid suspends particulates (commonly known as "gravel") to be deposited in a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing.

In some situations, fracturing and gravel-packing treatments are combined into a single treatment (commonly referred to as "frac-pack" operations). In such "frac-pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

In order to create aqueous viscosified fluids for use in various subterranean treatment operations, generally a hydratable gelling agent is added to an aqueous fluid. The act of hydration causes the aqueous fluid to gel and thus increases its viscosity. Often it is desirable to increase the treatment fluid viscosity above the level that can be achieved with gelling agents alone. In such cases, a crosslinker may be added to the fluid that causes the gelling agent molecules to crosslink with neighboring gelling agent molecules to further increase viscosity.

However, while the viscosity increases brought by gelling agents and crosslinking agents are desirable to increase solids loading capacity and hydraulic head, they can act to undesirably increase the energy losses causes by the friction of the non-viscous fluid traveling through wellbore equipment and subterranean formations. While external friction reduction agents are known and they can be added to treatment fluids, it is also known that they are not indicated for use with crosslinked fluids due to their tendency to compromise gel performance by negatively impacting the formation of crosslinks.

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver treatment fluids of the present disclosure to a downhole location, according to one or more embodiments.

DETAILED DESCRIPTION

The embodiments of the present disclosure generally relate to aqueous-based treatment fluids that can be crosslinked while simultaneously acting as friction reducers. That is, the present invention avoids the pitfalls known to exist with external friction reducing agents, by instead grafting a friction reducing branch directly onto the backbone of the gelling agent.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure. Moreover, while compositions and methods are described herein in terms of "comprising" various components or steps, the compositions and methods can also "consist essentially of" or "consist of" the various components and steps.

Some embodiments provide methods of using polymers that have been grafted with both crosslinking sites and friction reducing sites. The methods are particularly suited to the grafting of polysaccharide backbones, including modified polysaccharides. By way of example, a long chain polysaccharide polymer such as guar or fenugreek may be intermittently grafted with the friction reducing polymer such as polyacrylamide. This modified polysaccharide is suitable both for cross-link with the appropriate metal crosslinker, such as boron, and providing friction reduction through use of the polyacrylamide grafts. Suitable polymer backbones may be comprised of derivatized polysaccharide polymers, non-derivatized polysaccharide polymers, or a combination thereof.

Suitable non-derivatized polysaccharide polymers include guar, fenugreek, xanthan, and cellulose, and combinations thereof. The term "fenugreek" as used herein refers to a specialized bore polymer, wherein every mannose monomer has a corresponding galactose monomer. By contrast typical guar exhibits a mannose to galactose ratio in the region of 1.3:1 or 1.4:1.

Suitable derivatized polysaccharide polymers include guar derivatives, fenugreek derivatives, derivatives of cellulosic-based polymers, phosphate-grafted polysaccharide polymers and sulfate-grafted polysaccharide polymers. Guar derivatives include hydroxypropyl guar (HPG), carboxymethylhydroxypropyl guar (CMHPG), and carboxymethyl guar (CMG). Fenugreek can be similarly derivatized to create hydroxypropyl fenugreek (HPF), carboxymethylhydroxypropyl fenugreek (CMHPF), and carboxymethyl fenugreek (CMF). Suitable derivatives of cellulosic-based polymers include carboxymethylcellulose (CMC), hydroxyethyl cellulose (HEC), and carboxymethylhydroxyethylcellulose (CMHEC), hydroxypropyl cellulose (HPC); alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethylcellulose; hydroxyalkylalkyl celluloses such as hydroxypropylmethyl cellulose.

Each of the above-listed polysaccharides, whether derivatized or non-derivatized may be used alone or in combination with one or more of the other listed polysaccharides.

The friction reducing ability of the polymers described herein is provided by intermittently grafting the above polymers with a friction reducing polymer side-arm. As noted above, one such functional graft is polyacrylamide. Other suitable friction-reducing polymers than can be grafted to the polymer backbone to provide friction reduction include: acrylamide polyisobutyl methacrylate, polymethyl methacrylate, polyisobutylene, a quaternized aminoalkyl acrylate (such as a copolymer of acrylamide and dimethylaminoethyl acrylate quaternized with benzyl chloride), a copolymer of acrylamide and acrylic acid, 2-acrylamido-2-methylpropanesulfonic acid, N,N-dimethyl acrylamide, vinylsulfonic acid, N-vinyl acetamide, N-vinyl formamide, and combinations of two or more of the above.

In some embodiments, once the friction-reducing grafted polymer (FRGP) is formed, it may be subjected to depolymerization. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver et al., the relevant disclosure of which is incorporated herein by reference. That is, the relatively long polymer may be broken down into smaller polymer units, preferably having a molecular weight of about 25,000 to about 400,000. The depolymerization may be achieved in any suitable manner known in the art. In one embodiment, the depolymerization is carried by adding the FRGP to a reactor vessel together with a quantity of hydrogen peroxide and water. The reactor vessel is heated to initiate the reaction, which, once it commences, is exothermic. The reactor vessel is maintained at about 100° F. to about 200° F. for a time sufficient for the polymer to degrade to a desired molecular weight. Alternatively, the FRGP may be formed from lower molecular weight monomers that are polymerized until the desired molecular weight is achieved. The depolymerized FRGP may then be added to an aqueous fluid for use in the treatments described herein, such as a fracturing treatment.

The grafting of the friction-reducing component onto the polymer backbone may be done either randomly, or block-wise. By "block-wise," what is meant is that the completed polymer will have sections (blocks) that are not grafted with the friction-reducing component and thus remain available as crosslink sites while other sections (blocks) along the backbone are grafted with the friction-reducing component. Generally, the friction reducing component grafted on to the polymer backbone exhibits a molecular weight between 1,000 and 1,000,000. The ratio of the friction reducing component molecular weight to the backbone polymer molecular weight (including any derivations thereto, that is, including the hydroxypropyl portion, wherein HPG polymer is used) ranges from about 1:100 to about 1:10.

Unless otherwise indicated, all numbers expressing quantities of ingredients, properties such as molecular weight, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Aqueous base fluids suitable for use in the treatment fluids of the embodiments of the present invention may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the first treatment fluids or second treatment fluids of the embodiments of the present invention. In certain embodiments, the density of the aqueous base fluid can be adjusted, among other purposes, to provide additional particulate transport and suspension in the treatment fluids used in the methods of the embodiments of the present invention. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate. In some embodiments, the pH range may preferably be from about 4 to about 11.

In those embodiments of the present invention where it is desirable to crosslink the gelling agent, the first treatment fluid and/or second treatment fluid may comprise one or more crosslinking agents. The crosslinking agents may comprise a borate ion, a metal ion, or similar component that is capable of crosslinking at least two molecules of the gelling agent. Examples of suitable crosslinking agents include, but are not limited to, borate ions, magnesium ions, zirconium IV ions, titanium IV ions, aluminum ions, antimony ions, chromium ions, iron ions, copper ions, magnesium ions, and zinc ions. These ions may be provided using any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the treatment fluids useful in the methods of the present invention in an amount sufficient to provide the desired degree of crosslinking between molecules of the gelling agent. In certain embodiments, the crosslinking agent may be present in the first treatment fluids and/or second treatment fluids of the embodiments of the present invention in an amount in the range of from about 0.005% to about 1% by weight of the treatment fluid. In certain embodiments, the crosslinking agent may be present in the treatment fluids of the embodiments of the present invention in an amount in the range of from about 0.05% to about 1% by weight of the first treatment fluid and/or second treatment fluid. One of ordinary skill in the art, with the benefit of this disclosure, will recognize the appropriate amount of crosslinking agent to include in a treatment fluid of the embodiments of the present invention based on, among other things, the temperature conditions of a particular application, the type of gelling agents used, the molecular weight of the gelling agents, the desired degree of viscosification, and/or the pH of the treatment fluid.

A variety of other additives can be included in the treatment fluids described therein. Such additives generally include a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Some embodiments provide methods of treating a portion of a subterranean formation comprising: providing an aqueous-based treatment fluid comprising a friction-reducing grafted polymer (FRGP); and placing the aqueous-based treatment fluid into a portion of a subterranean formation. Placing the first aqueous-based treatment fluid may be performed either at matrix flow rates or at a flow rate sufficient to create or extend at least one fracture within the portion of the subterranean formation.

Some embodiments provide methods of fracturing a portion of a subterranean formation comprising: providing an aqueous-based treatment fluid comprising a friction-reducing grafted polymer (FRGP); and placing the aqueous-based treatment fluid into a portion of a subterranean formation at a pressure sufficient to create or extend at least one fracture therein. Still other embodiments provide methods of fracturing a portion of a subterranean formation comprising: placing a first aqueous-based treatment fluid into a portion of a subterranean formation at a pressure sufficient to create or extend at least one fracture therein; and then placing a second aqueous-based treatment fluid comprising particulates into at least a portion of the at least one fracture such that the particulates form a particulate pack within the at least one fracture; wherein either the first aqueous-based treatment fluid, the second aqueous-based treatment fluid, or both comprise a friction-reducing grafted polymer (FRGP). In some further fracturing embodiments the friction-reducing grafted polymer may be depolymerized.

Some other embodiments provide methods of gravel packing a portion of a subterranean formation comprising: providing an aqueous-based treatment fluid comprising a friction-reducing grafted polymer (FRGP) and gravel; and placing the aqueous-based treatment fluid into an annulus surrounding a portion of a wellbore such that the gravel substantially fills the annulus. As used in this paragraph, the term "substantially" refers to the fact that while it is desirable to completely fill the annulus over the portion of the wellbore being treated, realistic placement often results in at least some voids. So long as the gravel pack operates as desired and does not need to be replaced for bad performance, the term "substantially" here is met. In some further fracturing embodiments, the friction-reducing grafted polymer may be depolymerized.

Some other embodiments provide methods of frac-packing a portion of a subterranean formation comprising: placing a first aqueous-based treatment fluid into a portion of a subterranean formation at a pressure sufficient to create or extend at least one fracture therein; and then placing a second aqueous-based treatment fluid comprising particulates into at least a portion of the at least one fracture such that the fracture is substantially filled with particulates and the particulates substantially fill the fracture back to the annulus of the wellbore, thereby forming a particulate-packed fracture and a gravel pack at the annulus; wherein either the first aqueous-based treatment fluid, the second aqueous-based treatment fluid, or both comprise a friction-reducing grafted polymer (FRGP). As used in this paragraph, the term "substantially" refers to the fact that while it is desirable to completely fill the fracture and the annulus over the portion of the wellbore being treated, realistic placement often results in at least some voids. So long as the fracture pack and gravel pack operate as desired and do not need to be replaced for bad performance, the term "substantially" here is met. In some further fracturing embodiments, the friction-reducing grafted polymer may be depolymerized.

In various embodiments, systems configured for delivering the treatment fluids described herein to a downhole location are described. In various embodiments, the systems can comprise a pump fluidly coupled to a tubular, the tubular containing a treatment fluid comprising a friction-reducing grafted polymer (FRGP).

The pump may be a high-pressure pump in some embodiments. As used herein, the term "high-pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some embodiments, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high-pressure pump that is fluidly coupled to the tubular. That is, in such embodiments, the low pressure pump may be configured to convey the treatment fluid to the high-pressure pump. In such embodiments, the low pressure pump may "step up" the pressure of the treatment fluid before it reaches the high-pressure pump.

In some embodiments, the systems described herein can further comprise a mixing tank that is upstream of the pump and in which the treatment fluid is formulated. In various embodiments, the pump (e.g., a low pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids comprising a friction-reducing grafted polymer (FRGP) may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method of treating a portion of a subterranean formation comprising: providing an aqueous-based treatment fluid comprising a friction-reducing grafted polymer and gravel, wherein the friction-reducing grafted polymer comprises a friction reducing polymer grafted to the polymer backbone; and, placing the aqueous-based treatment fluid into a portion of a subterranean formation.

B. A method of treating a portion of a subterranean formation comprising: placing a first aqueous-based treatment fluid into a portion of a subterranean formation at a pressure sufficient to create or extend at least one fracture within the portion of the subterranean formation; and then placing a second aqueous-based treatment fluid comprising particulates into at least a portion of the at least one fracture such that the particulates form a particulate pack within the at least one fracture; wherein either the first aqueous-based treatment fluid, the second aqueous-based treatment fluid, or both comprise a friction-reducing grafted polymer, wherein the friction-reducing grafted polymer comprises a friction reducing polymer grafted to the polymer backbone.

C. A method of frac-packing a portion of a subterranean formation comprising: placing a first aqueous-based treatment fluid into a portion of a subterranean formation at a pressure sufficient to create or extend at least one fracture therein; and then placing a second aqueous-based treatment fluid comprising particulates into at least a portion of the at least one fracture such that the fracture is substantially filled with particulates and the particulates substantially fill the fracture back to the annulus of the wellbore; wherein either the first aqueous-based treatment fluid, the second aqueous-based treatment fluid, or both comprise a friction-reducing grafted polymer, wherein the friction-reducing grafted polymer comprises a friction reducing polymer grafted to the polymer backbone.

D. A system of treating a portion of a subterranean formation comprising: providing an aqueous-based treatment fluid comprising a friction-reducing grafted polymer and gravel, wherein the friction-reducing grafted polymer comprises a friction reducing polymer grafted to the polymer backbone; and, conveying the aqueous-based treatment fluid from a wellhead through a tubular and into a portion of a subterranean formation using a pump.

Each of embodiments A, B, C, and D may have one or more of the following additional elements in any combination:

Element 1: wherein the treatment fluid is: a fracturing fluid that is placed within the subterranean formation at a pressure sufficient to create or extend at least one fracture within the portion of the subterranean formation; a gravel packing fluid placed into a wellbore annulus within the subterranean formation to form a gravel pack therein; or a frac-packing fluid placed within the formation to pack a fracture within the formation with particulates and to fill a wellbore annulus within the subterranean formation adjacent to the fracture with a gravel pack.

Element 2: wherein the friction-reducing grafted polymer depolymerized.

Element 3: wherein the friction-reducing grafted polymer comprises a polymer backbone comprises a non-derivatized polysaccharide polymer, a derivatized polysaccharide polymer, or a combination thereof.

Element 4: wherein the friction-reducing grafted polymer comprises a non-derivatized polysaccharide polymer selected from the group consisting of guar, fenugreek, and a combination thereof.

Element 5: wherein the polymer backbone comprises a derivatized polysaccharide polymer selected from the group consisting of guar derivative, fenugreek derivative, derivatives of cellulosic-based polymers, phosphate-grafted polysaccharide polymers, and sulfate-grafted polysaccharide polymers.

Element 6: wherein the polymer backbone comprises a derivatized polysaccharide polymer selected from the group consisting of: hydroxypropyl guar, carboxymethylhydroxypropyl guar, carboxymethyl guar, hydroxypropyl fenugreek, carboxymethylhydroxypropyl fenugreek, carboxymethyl fenugreek, carboxymethylellulose, hydroxyethyl cellulose, and carboxymethylhydroxyethylcellulose, hydroxypropyl cellulose; a alkyhydroxyalkyl celluloses, an alkyl cellulose, an alkylcarboxyalkyl cellulose, an alkylalkyl cellulose, a hydroxyalkylalkyl cellulose, or a combination thereof.

Element 7: wherein the friction reducing polymer grafted to the polymer backbone is selected from the group consisting of: acrylamide polyisobutyl methacrylate, polymethyl methacrylate, polyisobutylene, a quaternized aminoalkyl acrylate (such as a copolymer of acrylamide and dimethylaminoethyl acrylate quaternized with benzyl chloride), a copolymer of acrylamide and acrylic acid, 2-acrylamido-2-methylpropanesulfonic acid, N,N-dimethyl acrylamide, vinylsulfonic acid, N-vinyl acetamide, N-vinyl formamide, and combinations of two or more of the above.

By way of non-limiting example, exemplary combinations applicable to embodiments A, B, C, or D include: A, B, C, or D with elements 2, 3, and 7; A, B, C, or D with elements 2, 4, and 7; A, B, C, or D with elements 5 and 6; or A, B, C, or D with elements 2, 5, and 6.

To facilitate a better understanding of the embodiments of the present invention, the following examples of preferred or representative embodiments are given. In no way should the following examples be read to limit, or to define, the scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a portion of a subterranean formation comprising:
   providing an aqueous-based treatment fluid comprising a friction-reducing grafted polymer, wherein the friction-reducing grafted polymer comprises a friction-reducing polymer grafted to some sections of the polymer backbone and remaining sections of the polymer backbone available as crosslink sites,
   wherein the friction-reducing polymer is one selected from the group consisting of: acrylamide polyisobutyl methacrylate, polymethyl methacrylate, polyisobutylene, a quaternized aminoalkyl acrylate, including a copolymer of acrylamide and dimethylaminoethyl acrylate quaternized with benzyl chloride, a copolymer of acrylamide and acrylic acid, 2-acrylamido-2-methylpropanesulfonic acid, N,N-dimethyl acrylamide, vinylsulfonic acid, N-vinyl acetamide, N-vinyl formamide, and combination of two or more of the above; and
   placing the aqueous-based treatment fluid into a portion of a subterranean formation.

2. The method of claim 1, wherein the treatment fluid is:
(a) a fracturing fluid that is placed within the subterranean formation at a pressure sufficient to create or extend at least one fracture within the portion of the subterranean formation; (b) a gravel packing fluid, further comprising particulates, placed into a wellbore annulus within the subterranean formation to form a particulate pack therein; or (c) a frac-packing fluid, further comprising particulates, placed within the formation to pack a fracture within the formation with particulates and to fill a wellbore annulus within the subterranean formation adjacent to the fracture with a gravel pack.

3. The method of claim 1, wherein the friction-reducing grafted polymer is depolymerized.

4. The method of claim 1, wherein the friction-reducing grafted polymer comprises a polymer backbone comprising a non-derivatized polysaccharide polymer, a derivatized polysaccharide polymer, or a combination thereof.

5. The method of claim 1, wherein the friction-reducing grafted polymer comprises a non-derivatized polysaccharide polymer selected from the group consisting of guar, fenugreek, and a combination thereof.

6. The method of claim 1, wherein the polymer backbone comprises a derivatized polysaccharide polymer selected from the group consisting of guar derivative, fenugreek derivative, derivatives of cellulosic-based polymers, phosphate-grafted polysaccharide polymers, and sulfate-grafted polysaccharide polymers.

7. The method of claim 1, wherein the polymer backbone comprises a derivatized polysaccharide polymer selected from the group consisting of: hydroxypropyl guar, carboxymethylhydroxypropyl guar, carboxymethyl guar, hydroxypropyl fenugreek, carboxymethylhydroxypropyl fenugreek, carboxymethyl fenugreek, carboxymethylellulose, hydroxyethyl cellulose, and carboxymethylhydroxyethylcellulose, hydroxypropyl cellulose; a alkyhydroxyalkyl celluloses, an alkyl cellulose, an alkylcarboxyalkyl cellulose, an alkylalkyl cellulose, a hydroxyalkylalkyl cellulose, or a combination thereof.

8. A method of treating a portion of a subterranean formation comprising:
placing a first aqueous-based treatment fluid into a portion of a subterranean formation at a pressure sufficient to create or extend at least one fracture within the portion of the subterranean formation;
and then placing a second aqueous-based treatment fluid comprising particulates into at least a portion of the at least one fracture such that the particulates form a particulate pack within the at least one fracture;
wherein either the first aqueous-based treatment fluid, the second aqueous-based treatment fluid, or both comprise a friction-reducing grafted polymer, wherein the friction-reducing grafted polymer comprises a friction-reducing polymer grafted to some sections of the polymer backbone and remaining sections of the polymer backbone available as cros slink sites,
wherein the friction-reducing polymer is one selected from the group consisting of: acrylamide polyisobutyl methacrylate, polymethyl methacrylate, polyisobutylene, a quaternized aminoalkyl acrylate, including a copolymer of acrylamide and dimethylaminoethyl acrylate quaternized with benzyl chloride, a copolymer of acrylamide and acrylic acid, 2-acrylamido-2-methylpropanesulfonic acid, N,N-dimethyl acrylamide, vinylsulfonic acid, N-vinyl acetamide, N-vinyl formamide, and combination of two or more of the above.

9. The method of claim 8, wherein the friction-reducing grafted polymer is depolymerized.

10. The method of claim 8, wherein the friction-reducing grafted polymer comprises a non-derivatized polysaccharide polymer selected from the group consisting of guar, fenugreek, and a combination thereof.

11. The method of claim 8, wherein the polymer backbone comprises a derivatized polysaccharide polymer selected from the group consisting of guar derivative, fenugreek derivative, derivatives of cellulosic-based polymers, phosphate-grafted polysaccharide polymers, and sulfate-grafted polysaccharide polymers.

12. The method of claim 8, wherein the polymer backbone comprises a derivatized polysaccharide polymer selected from the group consisting of: hydroxypropyl guar, carboxymethylhydroxypropyl guar, carboxymethyl guar, hydroxypropyl fenugreek, carboxymethylhydroxypropyl fenugreek, carboxymethyl fenugreek, carboxymethylellulose, hydroxyethyl cellulose, and carboxymethylhydroxyethylcellulose, hydroxypropyl cellulose; a alkyhydroxyalkyl celluloses, an alkyl cellulose, an alkylcarboxyalkyl cellulose, an alkylalkyl cellulose, a hydroxyalkylalkyl cellulose, or a combination thereof.

13. A method of frac-packing a portion of a subterranean formation comprising:
placing a first aqueous-based treatment fluid into a portion of a subterranean formation at a pressure sufficient to create or extend at least one fracture therein;
and then placing a second aqueous-based treatment fluid comprising particulates into at least a portion of the at least one fracture such that the fracture is substantially filled with particulates and the particulates substantially fill the fracture back to the annulus of the wellbore;
wherein either the first aqueous-based treatment fluid, the second aqueous-based treatment fluid, or both comprise a friction-reducing grafted polymer, wherein the friction-reducing grafted polymer comprises a friction-reducing polymer grafted to some sections of the polymer backbone and remaining sections of the polymer backbone available as cros slink sites,
wherein the friction-reducing polymer is one selected from the group consisting of: acrylamide polyisobutyl methacrylate, polymethyl methacrylate, polyisobutylene, a quaternized aminoalkyl acrylate, including a copolymer of acrylamide and dimethylaminoethyl acrylate quaternized with benzyl chloride, a copolymer of acrylamide and acrylic acid, 2-acrylamido-2-methylpropanesulfonic acid, N,N-dimethyl acrylamide, vinylsulfonic acid, N-vinyl acetamide, N-vinyl formamide, and combination of two or more of the above.

14. The method of claim 13, wherein the friction-reducing grafted polymer is depolymerized.

15. The method of claim 13, wherein the friction-reducing grafted polymer comprises a non-derivatized polysaccharide polymer selected from the group consisting of guar, fenugreek, and a combination thereof.

16. The method of claim 13, wherein the polymer backbone comprises a derivatized polysaccharide polymer selected from the group consisting of guar derivative, fenugreek derivative, derivatives of cellulosic-based polymers, phosphate-grafted polysaccharide polymers, and sulfate-grafted polysaccharide polymers.

17. The method of claim 13, wherein the polymer backbone comprises a derivatized polysaccharide polymer selected from the group consisting of: hydroxypropyl guar, carboxymethylhydroxypropyl guar, carboxymethyl guar, hydroxypropyl fenugreek, carboxymethylhydroxypropyl fenugreek, carboxymethyl fenugreek, carboxymethylellulose, hydroxyethyl cellulose, and carboxymethylhydroxyethylcellulose, hydroxypropyl cellulose; a alkyhydroxyalkyl celluloses, an alkyl cellulose, an alkylcarboxyalkyl cellulose, an alkylalkyl cellulose, a hydroxyalkylalkyl cellulose, or a combination thereof.

* * * * *